No. 822,120. PATENTED MAY 29, 1906.
B. W. HARRIS.
OVERHEAD RAILWAY.
APPLICATION FILED OCT. 18, 1905.
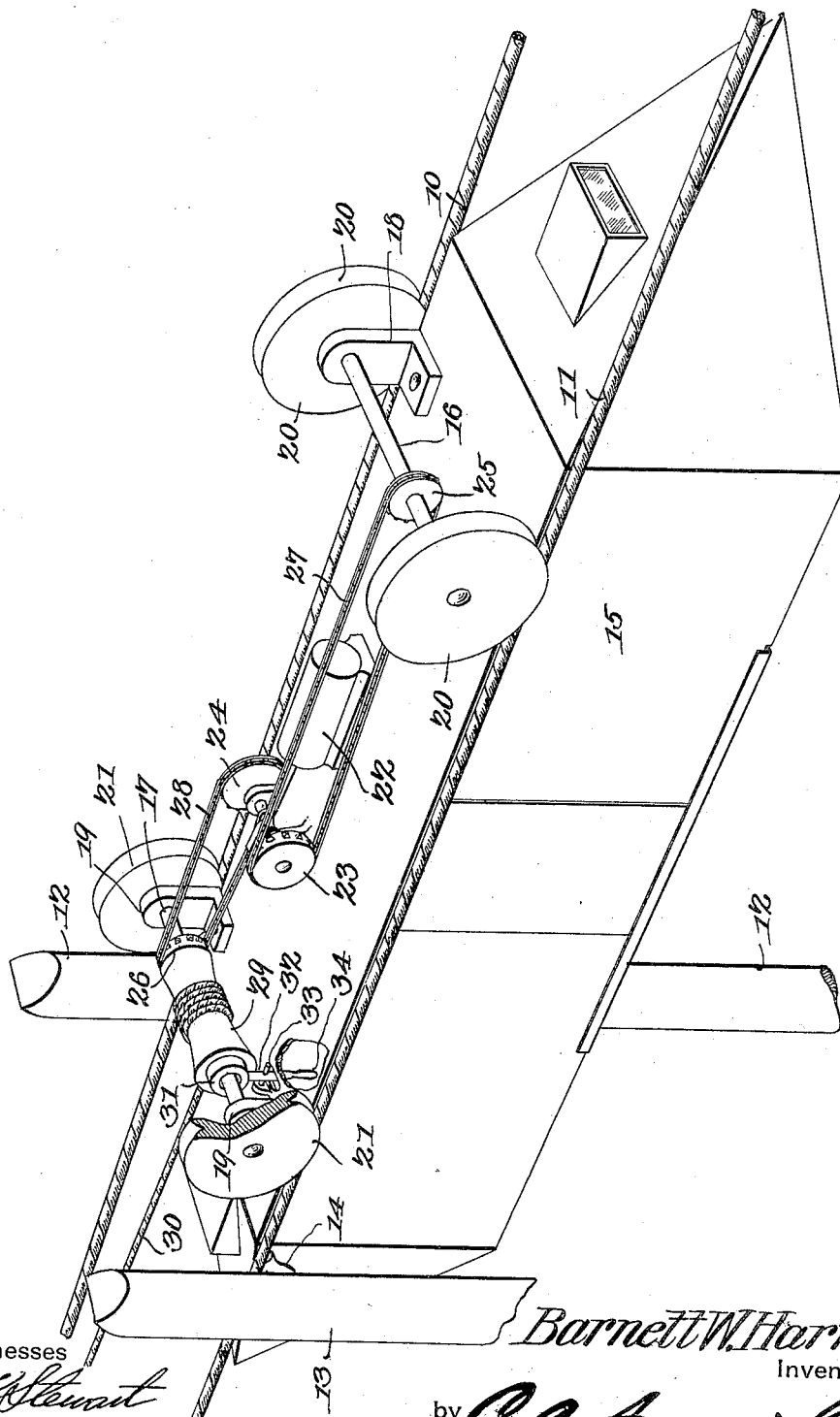
Witnesses
Barnett W. Harris,
Inventor.
by C. A. Snow & Co.
Attorneys

UNITED STATES PATENT OFFICE.

BARNETT W. HARRIS, OF MATTOON, ILLINOIS.

OVERHEAD RAILWAY.

No. 822,120.  Specification of Letters Patent.  Patented May 29, 1906.

Application filed October 18, 1905. Serial No. 283,308.

*To all whom it may concern:*

Be it known that I, BARNETT W. HARRIS, a citizen of the United States, residing at Mattoon, in the county of Coles and State of Illinois, have invented a new and useful Overhead Railway, of which the following is a specification.

This invention relates to suspended cableways, and has for an object to provide a car for use upon such ways embodying new and improved features of utility and efficiency.

A further object of the invention is to provide a car having a winding-reel about which is wound one end of a cable, the other end of which is attached to a stationary object, and a motor to wind the cable upon the reel to draw the car up unusually abrupt inclines.

With these and other objects in view the present invention consists in the combination and arrangement of parts, as will be hereinafter fully described, shown in the accompanying drawing, and particularly pointed out in the appended claims, it being understood that changes in the form, proportion, size, and minor details may be made without departing from the spirit or sacrificing any of the advantages of this invention.

The drawing is a perspective view of the improved suspended cableway and the car for traveling thereon.

The improved cableway forming the subject-matter of this application comprises parallel cables 10 and 11, mounted in any approved manner adjacent the tops of spaced pairs of columns 12 and 13, as by the brackets 14. For use upon the track so formed a car 15 is provided, having axles 16 and 17 rotatably mounted in bearings 18 and 19 and carrying wheels 20 and 21, traveling upon the cables 10 and 11.

To rotate the wheels, a motor of any approved kind, as a gasolene or gas engine, electric or other kind of motor, is mounted upon the top of the car, as shown conventionally at 22. The motor 22 operates sprocket-wheels 23 and 24, which are connected, respectively, with sprocket-wheels 25 and 26 upon the axles by the chains 27 and 28.

Upon one or both axles, as 17, is rigidly mounted a winding-reel, as shown at 29, about which may be wound one end of a cable 30, the other end of which may be attached to one of the columns or any convenient stationary object.

About the axle 17 is loosely disposed a brake-ring 31, carried upon the end of a lever 32 and bearing against the end of the reel 29. The lever 32 is pivoted at 33 and extending through the top of the car terminates in a handle 34 within the car for manipulating the brake.

It will be understood that for ordinary travel the wheels 20 and 21, engaging the cables, will be sufficient traction to operate the car. When, however, an abrupt incline is to be ascended, a cable, as 30, secured at the top, may be wound about the reel 29, and the winding thereon will draw the car up the incline. When going down the incline, the speed may be regulated from within the car by the manipulation of the brake.

Having thus described the invention, what is claimed is—

1. The combination with an overhead track, of a car suspended from said track and mounted for travel thereon, a drum journaled on the car, a cable one end of which is attached to a stationary support and the opposite end thereof to said drum, and a motor carried by the car and operatively connected with the drum for rotating the latter.

2. The combination with an overhead track, of a car suspended from the track and provided with wheels for engagement with said track, a drum secured to one of the axles of the wheels, a cable one end of which is attached to a stationary support and the opposite end thereof to said drum, a motor carried by the car and operatively connected with the drum for rotating the latter, and a brake adapted to engage the drum and provided with an operating-handle the free end of which projects through an opening in the top of the car and extends within the latter.

3. The combination with an overhead cable, of a car suspended from the cable and provided with grooved wheels for engagement with said cable, a drum secured to one of the axles of the wheels, a cable one end of which is secured to a stationary support and the opposite end thereof to said drum, a motor carried by the car and operatively connected with the drum for rotating the latter, and a brake pivotally mounted in bearings on the top of the car and having one end thereof embracing the adjacent axle for engagement with the drum and its free end projecting through an opening in the top of the car and extending within the latter.

In testimony that I claim the foregoing as my own I have hereto affixed my signature in the presence of two witnesses.

BARNETT W. HARRIS.

Witnesses:
 CARRIE JAMES,
 IRMA LINN.